United States Patent Office 3,297,784
Patented Jan. 10, 1967

---

3,297,784
ALPHA OLEFIN POLYMER MODIFIED THERMOPLASTIC POLYHYDROXYETHER COMPOSITIONS
Robert H. Snedeker, New Brunswick, N.J., and George H. Potter, St. Albans, and Clyde J. Whitworth, Jr., and Nathan L. Zutty, Charleston, W. Va., assignors to Union Carbide Corporation, a corporation of New York
No Drawing. Filed Dec. 17, 1964, Ser. No. 419,204
15 Claims. (Cl. 260—837)

This invention relates to olefin polymer modified thermoplastic polyhydroxyether compositions and more particularly to those having improved notched impact strength, critical thickness and stress crack resistance.

Thermoplastic polyhydroxyether has many physical properties useful in the fabrication of shaped forms and articles such as tensile strength, tensile modulus, creep resistance, flexural strength, flexural modulus, heat distortion temperature and impact values such as Charpy, tensile impact, falling dart and unnotched Izod impact strengths. However, its notched Izod impact strength is surprisingly low, viz., about 2.0 ft. lbs./in. This notch sensitivity limits the use of thermoplastic polyhydroxyether in applications where machined parts, bolted or screwed articles, or parts which can be scratched are subjected to and must withstand repeated impacts.

It is, therefore, an object of this invention to provide modifiers which improve the notched impact strength of thermoplastic polyhydroxyether without appreciable attenuation of other physical properties.

It has now been discovered that these and other objects have been accomplished with thermoplastic polyhydroxyether compositions containing from about 0.1 part to 10 parts by weight of alpha olefin polymer per 100 parts of polyhydroxyether therein.

The addition of the olefinic modifiers can be accomplished by roll-milling, extrusion or any of the common compounding techniques known in the art.

The term "thermoplastic polyhydroxyether" herein refers to substantially linear polymers having the general formula:

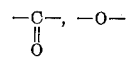

wherein D is the radical residuum of a dihydric phenol, E is an hydroxyl containing radical residuum of an epoxide, and $n$ represents the degree of polymerization and is at least 30 and is preferably 80 or more. The term "thermoplastic polyhydroxyether" is intended to include mixtures of at least two thermoplastic polyhydroxyethers.

The thermoplastic poly(hydroxyethers) can be prepared by admixing from about 0.985 to about 1.015 moles of an epihalohydrin with one mole of a dihydric phenol together with from about 0.6 to 1.5 moles of an alkali metal hydroxide, such as, sodium hydroxide or potassium hydroxide generally in an aqueous medium at a temperature of about 10° to about 50° C. until at least about 60 mole percent of the epihalohydrin has been consumed. The thermoplastic poly(hydroxyethers) thus produced have reduced viscosities of at least 0.43. Reduced viscosity values were computed by use of the equation:

$$\text{Reduced viscosity} = \frac{t_s - t_0}{ct_0}$$

wherein $t_0$ is the efflux time of the solvent (tetrahydrofuran), $t_s$ is the efflux time of the poly(hydroxyether) solution, $c$ is the concentration of the poly(hydroxyether) solution in terms of grams of poly(hydroxyether) per 100 ml. of tetrahydrofuran.

The dihydric phenol contributing the phenol radical residuum, D, can be either a dihydric mononuclear phenol such as those having the general formula:

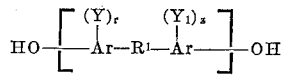

wherein Ar is an aromatic divalent hydrocarbon such as naphthalene, and, preferably, phenylene, Y and $Y_1$ which can be the same or different are alkyl radicals, preferably having from 1 to 4 carbon atoms, halogen atoms, i.e., fluorine, chlorine, bromine and iodine, or alkoxy radicals, preferably having from 1 to 4 carbon atoms, $r$ and $z$ are integers having a value from 0 to a maximum value corresponding to the number of hydrogen atoms on the aromatic radical (Ar) which can be replaced by substituents and $R^1$ is a bond between adjacent carbon atoms as in dihydroxydiphenyl or a divalent radical including, for example,

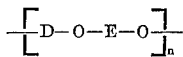

—S—, —SO—, —$SO_2$—, and —S—S—, and divalent hydrocarbon radicals such as alkylene, alkylidene, cycloaliphatic, e.g., cycloalkylene and cycloalkylidene, halogenated alkoxy or aryloxy substituted alkylene, alkylidene and cycloaliphatic radicals as well as alkarylene and aromatic radicals including halogenated, alkyl, alkoxy or aryloxy substituted aromatic radicals and a ring fused to an Ar group; or $R^1$ can be polyalkoxy, or polysiloxy, or two or more alkylidene radicals separated by an aromatic ring, a tertiary amino group, an ether linkage, a carbonyl group or a sulfur containing group such as sulfoxide, and the like.

Examples of specific dihydric polynuclear phenols include among others:

The bis(hydroxyphenyl)alkanes such as 2,2-bis(4-hydroxyphenyl)propane,
2,4'-dihydroxydiphenylmethane,
Bis(2-hydroxyphenyl)methane,
Bis(4-hydroxyphenyl)methane,
Bis(4-hydroxy-2,6-dimethyl-3-methoxyphenyl)methane,
1,1-bis(4-hydroxyphenyl)ethane,
1,2-bis(4-hydroxyphenyl)ethane,
1,1-bis(4-hydroxy-2-chlorophenyl)ethane,
1,1-bis(3-methyl-4-hydroxyphenyl)ethane,
1,3-bis(3-methyl-4-hydroxyphenyl)propane,
2,2-bis(3-phenyl-4-hydroxyphenyl)propane,
2,2-bis(3-isopropyl-4-hydroxyphenyl)propane,
2,2-bis(4-hydroxynaphthyl)propane,
2,2-bis(4-hydroxyphenyl)pentane,
3,3-bis(4-hydroxyphenyl)pentane,
2,2-bis(4-hydroxyphenyl)heptane,
Bis(4-hydroxyphenyl)phenylmethane,
Bis(4-hydroxyphenyl)cyclohexylmethane,
1,2-bis(4-hydroxyphenyl-1,2-bis(phenyl)propane,
2,2-bis(4-hydroxyphenyl)-1-phenyl-propane and the like;
Di(hydroxyphenyl)sulfones, such as
Bis(4-hydroxyphenyl)sulfone,
2,4'-dihydroxydiphenyl sulfone,
5'-chloro-2,4'-dihydroxydiphenyl sulfone,
5'-chloro-4,4'-dihydroxydiphenyl sulfone and the like;
Di(hydroxyphenyl)ethers such as
Bis(4-hydroxyphenyl)ether,
the 4,3'-, 4,2'-, 2,2'- 2,3'-, dihydroxydiphenyl ethers,
4,4'-dihydroxy-2,6-dimethyldiphenyl ether,
Bis(4-hydroxy-3-isobutylphenyl)ether,
Bis(4-hydroxy-3-isopropylphenyl)ether,
Bis(4-hydroxy-3-chlorophenyl)ether, Bis(4-hydroxy-3-fluorophenyl)ether,
Bis(4-hydroxy-3-bromophenyl)ether,
Bis(4-hydroxynaphthyl)ether,
Bis(4-hydroxy-3-chloronaphthyl)ether,
Bis(2-hydroxydiphenyl)ether,
4,4′-dihydroxy-2,6-dimethoxydiphenyl ether,
4,4′-dihydroxy-2,5-diethoxydiphenyl ether, and the like.

Also suitable are the bisphenol reaction products of 4-vinylcyclohexene and phenols, e.g., 1,3-bis(p-hydroxyphenyl)-1-ethylcyclohexane, and the bisphenol reaction products of dipentene or its isomers and phenols such as 1,2 - bis(p - hydroxyphenyl) - 1-methyl-4-isopropylcyclohexane as well as bisphenols such as 1,3,3-trimethyl-1-(4-hydroxyphenyl)-6-hydroxyindane, and 2,4-bis(4-hydroxyphenyl)-4-methylpentane, and the like.

Particularly desirable dihydric polynuclear phenols have the formula

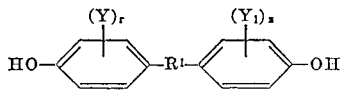

wherein Y and $Y_1$ are as previously defined, $r$ and $z$ have values from 0 to 4 inclusive and $R^1$ is a divalent saturated aliphatic hydrocarbon radical, particularly alkylene and alkylidene radicals having from 1 to 3 carbon atoms, and cycloalkylene radicals having up to and including 10 carbon atoms.

Mixtures of dihydric phenols can also be employed and whenever the term "dihydric phenol" or "dihydric polynuclear phenol" is used herein, mixtures of these compounds are intended to be included.

The epoxide contributing the hydroxyl containing radical residuum, E, can be a monoepoxide or diepoxide. By "epoxide" is meant a compound containing an oxirane group, i.e., oxygen bonded to two vicinal aliphatic carbon atoms, thus,

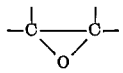

A monoepoxide contains one such oxirane group and provides a radical residuum E containing a single hydroxyl group, a diepoxide contains two such oxirane groups and provides a radical residuum E containing two hydroxyl groups. Saturated epoxides, by which term is meant diepoxides free of ethylenic unsaturation, i.e., >C=C< and acetylenic unsaturation, i.e., —C≡C—, are preferred. Particularly preferred are halogen substituted saturated monoepoxides, i.e., the epihalohydrins and saturated diepoxides which contain solely carbon, hydrogen and oxygen, especially those wherein the vicinal or adjacent carbon atoms form a part of an aliphatic hydrocarbon chain. Oxygen in such diepoxides can be, in addition to oxirane oxygen, ether oxygen —O—, oxacarbonyl oxygen

carbonyl oxygen

and the like.

Specific examples of monoepoxides include epihalohydrins such as epichlorohydrin, epibromohydrin, 1,2-epoxy-1-methyl - 3 - chloropropane, 1,2-epoxy-1-butyl-3-chloropropane, 1,2-epoxy-2-methyl-3-fluoropropane, and the like.

Illustrative diepoxides include diethylene glycol bis(3,4-epoxycyclohexane-carboxylate),
Bis(3,4-epoxycyclohexylmethyl)adipate,
Bis(3,4-epoxycyclohexylmethyl)phthalate,
6-methyl-3,4-epoxycyclohexylmethyl-6-methyl-3,4-
 epoxycyclohexane carboxylate,
2-chloro-3,4-epoxycyclohexylmethyl-2-chloro-3,4-
 epoxycyclohexane-carboxylate,
diglycidyl ether,
Bis(2,3-epoxycyclopentyl)ether,
1,5-pentanediol bis(6-methyl-3,4-epoxycyclohexyl-
 methyl)ether,
Bis(2,3-epoxy-2-ethylhexyl)adipate,
diglycidyl maleate,
diglycidyl phthalate,
3-oxatetracyclo[4.4.0.1$^{7,10}$.0$^{2,4}$]undec-8-yl 2,3-epoxy-
 propyl ether,
Bis(2,3-epoxycyclopentyl)sulfone,
Bis(3,4-epoxyhexoxypropyl)sulfone,
2,2′-sulfonyldiethyl bis(2,3-epoxycyclopentane-
 carboxylate),
3-oxatetracyclo[4.4.0.1$^{7,10}$10$^{2,4}$]undec-8-yl 2,3-epoxy-
 butyrate,
4-pentenal-di-(6-methyl-3,4-epoxycyclohexylmethyl)
 acetal,
ethylene glycol bis(9,10-epoxystearate),
diglycidyl carbonate,
Bis(2,3-epoxybutylphenyl)-2-ethylhexyl phosphate,
diepoxydioxane,
butadienedioxide, and
2,3-dimethyl butadiene dioxide.

The preferred diepoxides are those wherein each of the oxirane groups is connected to an electron donating substituent which is not immediately connected to the carbon atoms of that oxirane group. Such diepoxides having the grouping

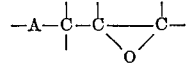

wherein A is an electron donating substituent such as
—O—,

—S—, —SO—, —SO$_2$—,

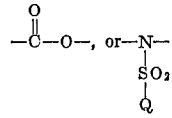

and Q is a saturated hydrocarbon radical such as an alkyl, cycloalkyl, aryl or aralkyl radical.

The term "olefin polymer" is used in the present specification and claims to denote normally solid homopolymers of olefinically unsaturated hydrocarbons as well as normally solid copolymers thereof. Preferred olefin polymers in this invention contain at least 50 percent by weight of a combined mono-olefinically unsaturated hydrocarbon having from 2 to 4 carbon atoms inclusive, i.e., butene-1, propylene and ethylene. Ethylene polymers are especially preferred as the olefin polymer used in the composition of this invention.

The ethylene polymer preferred in the composition should desirably be a grade suitable for injection molding having a density of about 0.90 to 0.93. Copolymers of ethylene combined with one or more other organic compounds copolymerizable therewith which contain polymer producing unsaturation can also be used, as for example, monoolefins such as propylene, butenes, pentenes, hexenes, heptenes, octenes, dodecenes, octadecenes and the like; diolefins such as butadiene, isoprene, chloroprene, hexadiene, octadiene, decadiene and the like; acetylene; other olefinically unsaturated comonomers such as vinyl formate, vinyl acetate, vinyl propionate, vinyl butyrate, vinyl 2,4-dimethylpentoate, vinyl pelargonate, vinyl stearate, vinyl pivalate, vinyl tert-butyl acetate, vinyl benzoate, vinyl diethylacetate, vinyl beta, gamma-dimethyl valerate, vinyl thioacetate, vinyl alcohol, styrene, methylstyrenes, chlorostyrenes, maleic anhydride, diethyl maleate, diethyl fumarate, diethyl citraconate, 9-methylene-fluorene, beta-methylene-beta-propiolactone, vinyl isocoumarans such as 1,1,3,3-tetramethyl-4-vinylisocoumaran, 1,2-alkylene oxides, N-n-butylmaleimide, N-isobutylmaleimide, N-vinylphthalimide, N-methyl-N-vinyl acetamide, vinyl triethoxysilane, divinyl phosphonate, N-vinylcarbazole, methyl acrylate, ethyl acrylate, butyl acrylate, n-octyl acrylate, 2-ethylhexyl acrylate, decyl acrylate, lauryl acrylate, hexadecyl acrylate, octadecyl acrylate, methyl methacrylate, ethyl methacrylate, butyl methacrylate, octyl methacrylate, 2-ethylhexyl methacrylate, decyl methacrylate, lauryl methacrylate, tetradecyl methacrylate, hexadecyl methacrylate, octadecyl methacrylate, acrylic acid, methacrylic acid, methyl vinyl ether, ethyl vinyl ether, n-butyl vinyl ether, isobutyl vinyl ether, t-butyl vinyl ether, divinyl ether, vinyl methyl ketone, vinyl ethyl ketone, vinyl butyl ketone, terpenes, bicyclo(2.2.1)-2-heptenes, stilbene, dichloroethylene, vinyl chloride, vinyl fluoride, vinylidene chloride, vinylidene fluoride and the like; and miscellaneous compounds such as carbon monoxide, formaldehyde, sulfur dioxide and the like.

Preferred ethylene copolymers for use in the present invention include copolymers of ethylene copolymerized with propylene, alkyl acrylates such as ethyl acrylate, acrylic acid or vinyl esters such as vinyl acetate.

Particularly preferred ethylene copolymers are those containing up to about 45% by weight of propylene copolymerized therein, up to about 20% by weight of ethyl acrylate copolymerized therein, up to about 35% by weight of acrylic acid copolymerized therein or up to about 50% by weight of vinyl acetate copolymerized therein. The melt indices of these copolymers can be as high as about 1000 dg./min. or more although the preferred range is about 1 to 75 dg./min.

The invention is further illustrated by the examples which follow in which all parts and percentages are by weight unless otherwise specified.

Example 1

The thermoplastic polyhydroxyether used was prepared by the reaction of equimolar amounts of 2,2-bis(4-hydroxyphenyl)-propane and epichlorohydrin together with sodium hydroxide. Equipment used was a vessel provided with an agitator, thermometer, and reflux means. There was placed in the vessel:

| | Parts |
|---|---|
| 2,2-bis(4-hydroxyphenyl)propane | 114.5 |
| Epichlorohydrin (99.1%) pure | 46.8 |
| Ethanol | 96.0 |
| Butanol | 10.0 |
| Sodium hydroxide (97.5%) pure | 22.6 |
| Water | 70.0 |

The above mixture was stirred at room temperature for 16 hours to accomplish the initial coupling reaction. The mixture was then heated at 80° C. for an hour. Sixty parts of a 7:3 mixture of toluene:butanol was added to the vessel. Heating of the mixture at 80° C. was continued another two hours. There was added to the vessel an additional 50 parts of the 7:3 toluene:butanol mixture and 4.5 parts of phenol. The contents of the vessel were continued to be heated at 80° C. (reflux) for 2½ hours. Upon cooling, the reaction mixture was cut with 200 parts of the 7:3 toluene:butanol mixture. One hundred parts of water was added to the vessel and agitated with the contents to dissolve salts present in the reaction mixture. The vessel contents were allowed to settle for ten minutes during which time a lower brine phase formed. The lower phase was separated by decantation. The upper polymer solution containing phase was washed successively with two 160 part portions of water and a mixture of 85% phosphoric acid with 100 parts of water (pH=2) for one hour. The upper polymer solution phase was again separated by decantation and water washed with four successive 200 part portions of water containing 4.5% butanol. The washed polymer was then coagulated in isopropanol, filtered and dried. There was thus obtained a thermoplastic polyhydroxyether of 2,2-bis(4-hydroxyphenyl)propane and epichlorohydrin having a melt flow of 7.0 decigrams per minute. Melt flow of the thermoplastic polyhydroxyether was determined by weighing in grams the amount of a polyhydroxyether which, at a temperature of 220° C. and under a pressure of 44 p.s.i. flowed through an orifice having a diameter of 0.0825" and a length of 0.315" over a ten minute period. Four such determinations were averaged and reported as decigrams per minute under a pressure of 44 p.s.i. and at 220° C.

Examples 2–8

The compositions of this invention were prepared by adding the alpha olefin polymer to fluxing thermoplastic polyhydroxyether on a two-roll mill at 130–150° C. with a milling time of about 10 to 15 minutes. Plaques were prepared by compression molding the milled sheets for one to two minutes at about 160–185° C. at about 2000–3000 p.s.i. The effects of different olefin polymers on the notched impact strength of the control, unmodified polyhydroxyether and other physical properties is shown in Table I.

TABLE I.—PROPERTIES OF IMPACT MODIFIED POLYHYDROXYETHER

| Example | Modifier, percent By Wt. | Tensile Strength at break, 24° C., p.s.i. | Percent Elongation, 24° C. | Yield Stress, p.s.i. | Yield Elongation, percent | Heat Distortion,° C. at 264 p.s.i. | Izod Impact,[a] ft./lbs./in. |
|---|---|---|---|---|---|---|---|
| 2 | (None (control) | 6,800 | 90 | 9,400 | 8 | 84 | 2.0 |
| 3 | (10%)[c] | 6,500 | 130 | 6,500 | 7 | 87 | [b]4.2–8.2 |
| 4 | (5%)[c] | 7,775 | 130 | 8,340 | 7 | 86 | 15.8 |
| 5 | (5%)[d] | 7,400 | 140 | 8,500 | 7 | 84 | 22.0 |
| 6 | (5%)[e] | 8,000 | 140 | 8,500 | 8 | 83 | 21.0 |
| 7 | (5%)[f] | | | | | 84 | 15.6 |
| 8 | (5%)[g] | 7,500 | 130 | 7,600 | 7 | 84 | 14.1 |
| 9 | (5%)[h] | 6,800 | 36 | 6,800 | 7 | 85 | 16.6 |

[a] Izod Impact measured on ⅛" x ½" compression molded bars.
[b] ¼" x ½" bar.
[c] 82/18 wt. percent ethylene/ethyl acrylate copolymer having a melt index of 2.
[d] 72/28 wt. percent ethylene/vinyl acetate copolymer having a melt index of 22.
[e] 55/45 wt. percent ethylene/vinyl acetate copolymer.
[f] 80/20 wt. percent ethylene/vinyl acetate copolymer.
[g] Low density polyethylene (0.90–0.92).
[h] 58/42 wt. percent ethylene/propylene copolymer.

An examination of these data reveals that truly significant increases in ⅛" notched Izod impact strength, viz., from 2.0 to 22 ft. lbs./in. were achieved with inappreciable loss in other physical properties and in some instances even improvements in other physical properties.

Examples 10–15

The effect of concentration of one modifier polymer ethylene/vinyl acetate (72%/28%), on notched impact strength at 1 to 5% is shown in Table II.

TABLE II

| Example No. | Polymer Modifier | Modifier, percent by Wt. | Izod Impact,[2] ft. lbs./in. |
|---|---|---|---|
| 10 | Ethylene/vinyl acetate [1] | 5 | 22 |
| 11 | do | 4 | 24 |
| 12 | do | 3 | 13 |
| 13 | do | 2 | 14 |
| 14 | do | 1 | 3 |
| Control | None | 0 | 2 |

[1] 72/28 wt. percent (Melt Index=22 decigrams/minute).
[2] 1/8" x 1/2" compression molded bars.

TABLE III.—TIME TO FAILURE IN MINUTES AT INDICATED OUTER FIBER STRESS LEVELS

| Example | Copolymer | Wt. percent of Copolymer | 50% Aqueous Ethanol 1,400 p.s.i. | Breck Shampoo | | Planter's Peanut Oil 3,000 p.s.i. |
|---|---|---|---|---|---|---|
| | | | | Dry Hair 3,000 p.s.i. | Normal Hair 3,000 p.s.i. | |
| 18 | (None) Control | | 0.5 | 75 | 37 | 21 |
| 19 | (a) | 1.0 | >1,440 | 326 | | |
| 20 | (b) | 1.0 | >1,440 | | 300 | |
| 21 | (c) | 0.5 | >1,440 | | | |
| 22 | (c) | 1.0 | | 240 | | |
| 23 | (d) | 0.5 | >1,440 | 306 | | 27 |
| 24 | (d) | 0.75 | | | 99 | 23 |
| 25 | (d) | 1.0 | | | 121 | 177 |
| 26 | (d) | 5.0 | >1,440 | >1,440 | | >1,440 |
| 27 | (e) | 0.5 | | | 86 | |
| 28 | (e) | 1.0 | | | 86 | 221 |
| 29 | (f) | 1.0 | >1,440 | 127 | | | a Ethylene-acrylic acid copolymer containing 33% acrylic acid; Melt Index, 54.0.
b Ethylene acrylic acid copolymer containing 15% acrylic acid; Melt Index, 10.0.
c Ethylene-ethyl acrylate copolymer containing 18% ethyl acrylate; Melt Index, 2.
d Ethylene-vinyl acetate copolymer containing 28% vinyl acetate; Melt Index, 22.
e Ethylene-vinyl acetate copolymer containing 45% vinyl acetate; Melt Index, 16.9.
f Low density polyethylene (0.92).

*Example 16*

Propylene homopolymers and copolymer modifiers give results comparable to those described in Examples 10 to 15.

*Example 17*

The critical thickness of the various compositions given in the previous examples was above 250 mils in contrast with the unmodified polyhydroxyether control which was below 100 mils.

The following ASTM tests were used in obtaining the data describing this invention.

Test: ASTM No.

Stiffness modulus _____ D 790–61T
Tensile strength _____ D 790–61T
Percent elongation _____ D 790–61T
Yield stress _____ D 790–61T
Yield elongation _____ D 790–61T
Heat distortion _____ D 648–56
Izod impact strength _____ D 256–56
Melt index _____ D 1238–62T

*Example 18*

The effects of stress-cracking media on the stress-crack resistance of unmodified thermoplastic polyhydroxyether used as a control and the modified polyhydroxyethers of this invention were demonstrated using 40% aqueous ethanol, dry and normal hair Breck shampoo and Planter's peanut oil as the stress-cracking media. Breck shampoo is sold by John H. Breck, Inc.

The test used to evaluate the stress-crack resistance of the polyhydroxyether compositions consisted of noting the time required for a bent specimen, 1/4" x 4" x 20 mils, immersed in a stress-cracking media to visibly craze. Two levels of outer fiber stress were used, viz., 1400 p.s.i. and 3000 p.s.i. as determined by the method described by James E. Boyd on page 491 of "Strength of Materials," McGraw-Hill, New York, 1935. The test specimens were cut to size from the molded sheets prepared as described in Examples 2–8.

The superior stress-crack resistance of the modified polyhydroxyether compositions over the unmodified control is demonstrated by the data collected in Table III.

The modified olefin polymer composition of this invention can be used to fabricate shaped articles such as gears, housings, radio cabinets, machined parts, containers, bottles and the like produced by compression molding, injection molding, blow molding and other plastic fabrication techniques well known in the art.

Although the invention has been described in its preferred forms with a certain degree of particularity, it is understood that the present disclosure has been made only by way of example, and that numerous changes can be made without departing from the spirit and scope of the invention.

What is claimed is:

1. Thermoplastic polyhydroxyether compositions having enhanced notched Izod impact strength, improved critical thickness, and stress-crack resistance comprising:
   (a) thermoplastic polyhydroxyether having the general formula:

$$\pm D\!-\!O\!-\!E\!-\!O\!\pm_n$$

wherein D is the radical residuum of a dihydric polynuclear phenol in which the hydroxyl groups are attached to different nuclei, E is a radical residuum of an epoxide and $n$ is an integer which represents the degree of polymerization and is at least 30; and
   (b) from about 0.1 to about 10 parts of alpha-olefin polymer by weight per hundred parts of thermoplastic polyhydroxyether.

2. The composition claimed in claim 1 wherein the dihydric phenol is a bis(4-hydroxyphenyl)alkane and $n$ is at least 80.

3. The composition claimed in claim 2 wherein the bis(4-hydroxyphenyl)alkane is 2,2-bis(4-hydroxyphenyl) propane.

4. The composition claimed in claim 1 wherein the epoxide is an epihalohydrin and $n$ is at least 80.

5. The composition claimed in claim 4 wherein the epihalohydrin is epichlorohydrin.

6. The composition claimed in claim 1 wherein the alpha olefin polymer is a homopolymer.

7. The composition claimed in claim 6 wherein the alpha-olefin homopolymer is low density polyethylene.

8. The composition claimed in claim 1 wherein the alpha-olefin polymer is a copolymer.

9. The composition claimed in claim 8 wherein the copolymer is an ethylene/propylene copolymer containing up to 45% propylene by weight copolymerized therein.

10. The composition claimed in claim 8 wherein the copolymer is an ethylene/ethyl acrylate copolymer.

11. The composition claimed in claim 10 wherein the copolymer has a melt index of about 2 decigrams/minute and comprises up to about 20% by weight ethyl acrylate copolymerized therein.

12. The composition claimed in claim 8 wherein the copolymer is an ethylene/vinyl acetate copolymer.

13. The composition claimed in claim 12 wherein the copolymer comprises about 18–45% by weight vinyl acetate copolymerized therein.

14. The composition claimed in claim 8 wherein the copolymer is an ethylene/acrylic acid copolymer.

15. The composition claimed in claim 14 wherein the copolymer comprises up to about 35% by weight acrylic acid copolymerized therein.

References Cited by the Examiner
UNITED STATES PATENTS 3,262,988  7/1966  Joyce _____ 260—897

MURRAY TILLMAN, *Primary Examiner.*

P. LIEBERMAN, *Assistant Examiner.*